Oct. 28, 1941.  C. L. KELLER  2,261,032

NONOVERFILL AND RELIEF DEVICE

Filed Nov. 15, 1939

INVENTOR.
CHARLES L. KELLER.
BY
Allen & Allen
ATTORNEYS.

Patented Oct. 28, 1941

2,261,032

UNITED STATES PATENT OFFICE 2,261,032

NONOVERFILL AND RELIEF DEVICE

Charles L. Keller, Cincinnati, Ohio, assignor to The Richardson Company, Lockland, Ohio, a corporation of Ohio Application November 15, 1939, Serial No. 304,590

6 Claims. (Cl. 136—178)

My invention relates to means for controlling the electrolyte in storage batteries and in particular to means for preventing over-filling of the various cells while permitting adequate venting of gas from the space above the electrolyte. My invention is related to my copending application entitled Liquid level control device for storage batteries, Serial No. 276,826, filed June 1, 1939, which issued February 25, 1941 as U. S. Letters Patent 2,233,081, in that a valve means is employed.

The general objects in my invention are the provision of means for the purpose described which are cheap, positive in action, readily replaced without disassembling the storage battery, and which do not complicate or increase the cost of manufacture of the cell cover.

In one aspect of my invention my object is to get away from the disadvantages of positive actuation means for a valve member. A disadvantage of a number of the positively actuated valves proposed in the past was felt in the operation of initially charging or forming the battery, during the course of which it is the practice to dump the electrolyte from the battery. A number of the previously suggested positively actuated valves were such as to close off the gas vent opening, which is situated above the maximum electrolyte level, in all positions of the storage battery. As a consequence, the operation of dumping became slow and difficult and it was not possible to remove from the battery all of the electrolyte which could have been removed were the valve open. In my structure this disadvantage is eliminated.

Also in another aspect of my invention I divorce the space containing the valve, whether the valve be positively actuated or not, from the opening through which the cell is filled, so that no displacement of the valve member can in any way interfere with the filling operation.

Again it is an object of my invention to provide means for preventing electrolyte, under the influence of gas pressure, from leaving the cell through the filling opening.

Still another object of my invention is the provision of a simpler structure in which a simple relief valve mechanism may be employed without the necessity for positive actuation.

These and other objects of my invention which will be set forth hereinafter or will be apparent to one skilled in the art upon reading this specification, I accomplish by that certain structure and arrangement of parts of which I shall now describe certain exemplary embodiments. Reference is made to the drawing wherein.

Briefly in the practice of my invention I provide, in connection with a cell cover, a filler opening having a tubular portion extending down to the desired maximum electrolyte level. The space within the cell cover above the electrolyte level is vented of gas through a valved opening. The valve member is of sufficient mass to counterbalance a column of liquid in the tubular portion referred to above, so that in filling the cell, as soon as the electrolyte reaches the end of the tubular portion, it rises rapidly therein giving to the operator a signal that the filling operation is complete and should be discontinued. Thereafter, when the filling opening is closed, the valve acts to vent the gases from the space above the electrolyte. I have found in one aspect of my invention that if the filling opening can be separately closed, positive mechanical actuation of the valve is not required, and the valve can act as a relief valve and will be effective automatically to relieve the gas pressure.

Figure 1:
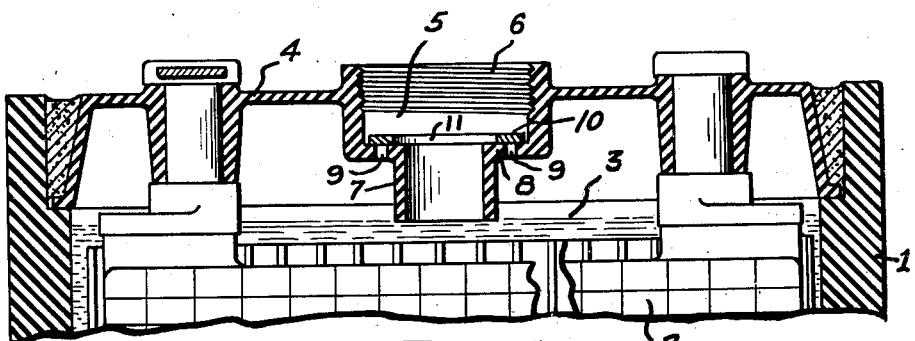
Figure 1 is a partial sectional view through the upper part of a cell of a storage battery showing the position of the parts with the filler cap removed.
Figure 2:
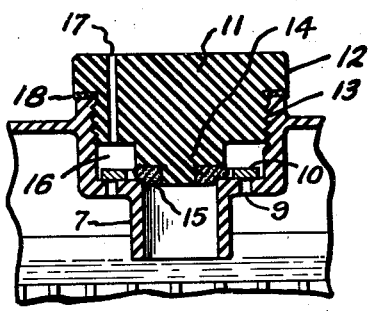
Figure 2 is a partial sectional view showing the filler cap in place.

I have shown such a structure in Figures 1 and 2. In the first figure, I indicates the walls of a storage battery cell within which is the plate assembly 2, the electrolyte being indicated at 3. The cell is provided with a cell cover 4 having a skirt to be sealed to the battery case with the usual sealing compound, and having conventional openings for the passage of the terminal lugs of the plate assembly. The cell cover has a filler opening in the form of a well 5, preferably threaded in its upper portion as at 6 or otherwise provided with means for the engagement therein of a filler cap. At the bottom of the well a tubular portion 7 passes downwardly to the desired maximum electrolyte level. The tubular portion is open through the bottom of the well and is of less diameter so that a shoulder 8 is left within the well. This shoulder is perforated with one or more perforations 9 exterior to the tubular portion 7 so that gas collecting within the hollow interior of the cell cover above the electrolyte may escape through these perforations. The bottom of the well forms a valve seat on which a valve member 10 rests. This valve member is in the form of a washer or perforated disc and is made of any suitable substance, having sufficient mass, and resistant to the storage battery electrolyte. It may be made, for example, of hard rubber, or other moulded compound; but I prefer to make it of non-corrosive metal, and in particular of antimonial lead. The mass of the valve member 10 should be such as to counterbalance a column of liquid rising within the tubular portion 7, so that when the electrolyte reaches the bottom of the tubular portion 7 it will rise rapidly therein a sufficient distance at least to give a signal to the operator that the filling operation should cease. It will be noted in Figure 1 that the diameter of the opening 11 in the valve member is sufficient to leave the opening in the interior of the tubular portion 7 unobstructed and further that the opening 11 is sufficiently larger than the internal diameter of the tubular portion 7 to disclose an annular portion of the bottom 8 of the well for a purpose which will hereinafter be described. The external diameter of the washer-shaped valve is such as to permit of a loose fit in the well 5, yet not so small as to permit essential displacement of the washer in the well. Or if desired valve guiding means may be employed for the washer as set forth in the copending case of O. O. Rieser entitled Electrolyte control devices, Serial No. 296,667, filed September 26, 1939.

When the filler cap is in place, if the tubular portion 7 may be closed off, the electrolyte cannot come out therethrough under gas pressure, and gas pressure developing within the space above the electrolyte can relieve itself through the openings 9 by pushing up the valve member. Hence mechanical actuation of the valve member is not necessary. As shown in Figure 2, I provide a filler cap 11 having the usual hand-grip portion 12, the threaded portion 13 for engagement within the filler opening, and an extension 14 for closing off the upper end of the tubular part 7 of the cell cover. To this end, the extension 14 is made larger in diameter than the internal diameter of the tubular part 7; and it may, if desired, be provided with a sealing washer 15 which will be pressed against the shoulder of the bottom of the well thus effectively sealing-off the tubular part 7 when the cap is in place.

Other sealing structures may be adopted within the purview of my invention. For example the extension 14 can be shaped to enter the part 7, in which it can have a sliding fit sufficiently close to act as a seal. Or the interior of the tubular part 7 can be threaded, and the extension 14 of the filler cap can likewise be threaded, in which event threaded engagement of the filler cap in the well proper can be eliminated.

The axial length of the extension 14 is such that when the filler cap is in place, a space 16 for valve movement is left above the valve within the well. When the tubular part 7 is sealed off as described or as shown in Figure 2, electrolyte cannot be forced out through the part 7, but gas accumulating under pressure in the hollow interior of the cell cover will escape therefrom through the perforations 9 by raising the valve member 10. Needless to say the filler cap itself will be vented, as by one or more perforations 17 communicating with the space 16, or equivalent venting means. The filler cap may be provided, if desired, with a washer 18.

Figure 3:
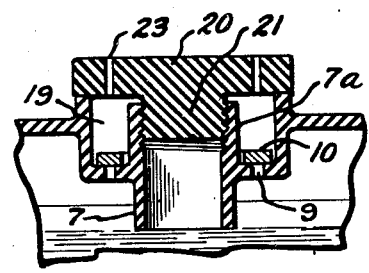
Figure 3 is a partial sectional view showing a modified form of the invention.

A modified structure is shown in Figure 3, and can be described as comprising an upward extension of the tubular part 7 within the well proper as at 7a. The part 7a rises nearly, but not quite to the height of the walls defining the well. This provides a filling opening—namely the parts 7—7a—essentially divorced from the valve mechanism and the space within which the valve is held; and changes the well into an annular space 19. The bottom of the well again provides the valve seat for the valve member 10, and is perforated as at 9. The filler cap 20 is shown as having an extension 21, the extension and tubular part 7a having cooperating threads. An obvious variant of this structure is to thread the interior of the well as before, and provide the filler cap with a cooperatingly threaded annular extension entering the space 19. In this event the extension 21 may be omitted, and a washer provided within the annular extension to close off the end of the part 7a. The filler cap is shown vented as at 23.

Figure 4:
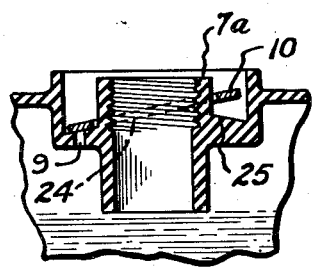
Figure 4 is a partial sectional view showing a further modification of Figure 3 in which a positively actuated valve member is employed.
Figure 5:
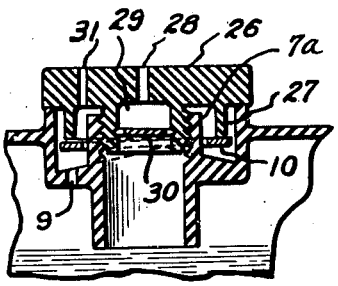
Figure 5 is a partial sectional view showing the structure of Figure 4 with the filler cap in place.

The isolation of the well proper or valve space from the filler tube is of advantage also with positively actuated valves. In Figures 4 and 5 a fulcrum is provided for the valve member 10 within the well. This may be provided by forming the bottom of the well in two mutually tilted planes 24 and 25 the meeting line of which forms the fulcrum, or it may be otherwise provided in any of the ways shown in the application of Rieser referred to above, or in the copending application of Rieser entitled Electrolyte control devices, Serial No. 303,296, filed November 7, 1939. The perforation 9 will be located in a portion of the well bottom which forms the seat for the valve. The filler cap 26 may be provided with an annular valve operating member 27 which enters the well, and, as the filler cap is turned down, positively tilts the valve member 10 to the position shown in Figure 5. In a structure in which the valve is mechanically operated, it is not necessary to seal off the filler opening, so that the filler cap may be vented as at 28—29 and provided with a splash washer 30 if desired. Since the filler opening is separate from the well, the filler cap should be vented over the well as at 31, or the well should be vented, above the shoulder, into the tubular part 7a.

It will be seen that all of these structures are extremely simple and inexpensive. Further, they permit the ready dumping of the electrolyte. The valve cannot remain closed when the battery is inverted, and air can enter the gas vent openings permitting a more copious flow of electrolyte from the filler opening. Also the battery will empty to the level of the gas vent openings. The valve members are readily taken out and replaced without disassembly of the battery.

Modifications may be made in my invention without departing from the spirit of it. Having thus described my invention, what I claim as new and desire to secure by Letters Patent is:

1. A storage battery cell having a top and a filler opening in the form of a well having a bottom, a tubular extension open through the bottom of said well and terminating downwardly below the top of said cell cover and the bottom of said well at such a position that if the level of electrolyte in a storage battery cell covered by said cell cover lies at the downward termination of said tubular extension, a sufficient space above said electrolyte and beneath the top of said cover will be provided for gas collection, said tubular extension being of less diameter than the diameter of the bottom of said well whereby the bottom of said well forms a shoulder, said shoulder having a perforation external to said tubular extension for the purpose of venting gases from said gas collection space, a weight actuated valve on said shoulder configured and disposed to permit filling of said cell through said tubular extension and having sufficient mass to counterbalance a column of electrolyte therein so as to give an overfill signal, and a filler cap adapted to be inserted in said filler well, said filler cap having means for closing off the top of said tubular extension so as to enforce the venting of gases through said perforation in said shoulder, there being means to permit the escape of said gases from said filler well to the outer air.

2. A storage battery cell cover having a top, and a filler opening in the form of a well with a bottom, a tubular extension open through the bottom of said well, and depending below the top of said cell cover and the bottom of said well a sufficient distance to provide a gas collection space above the electrolyte in a storage battery cell covered by said cover when the level of said electrolyte is substantially at the downward termination of said tubular extension, said tubular extension being of lesser diameter than the diameter of the bottom of said well, whereby the bottom of said well forms a shoulder about said tubular extension, said shoulder being perforated to permit the passage of gas from said gas collection space into said well, a washer shaped, weight operated valve member lying on said shoulder and adapted to close said perforations, said weight actuated valve member being perforated to permit the filling of the storage battery cell through said well and tubular extension, and the mass of said weight actuated valve member being sufficient to counterbalance a column of electrolyte in said tubular extension, whereby during the filling of said cell when electrolyte reaches the downward termination of said tubular extension the trapping of said gas in said gas collection space will cause said electrolyte to rise in said tubular extension to give an overfill signal, and a filler cap for said filler opening and adapted to be inserted therein, said filler cap having a means for closing off the top of said tubular extension whereby to enforce venting of the gases in said battery through the perforation in the bottom of said filler well, there being means of escape for said gases from said filler well into the outer air.

3. A structure as claimed in claim 2 in which said tubular extension terminates upwardly at the bottom of said filler well, said filler cap being relieved to permit operation of said valve in another portion.

4. A structure as claimed in claim 2 in which said tubular extension terminates upwardly at the bottom of said filler well, said filler cap being relieved to permit operation of said valve in another portion, and said filler cap being vented by having a perforation leading to the said relieved portion.

5. A structure as claimed in claim 2 in which said tubular extension terminates upwardly at the bottom of said filler well, said filler cap being relieved to permit operation of said valve in another portion, said filler cap being vented by having a perforation leading to the said relieved portion, and said filler cap also having means to seal the top of said filler well.

6. A structure as claimed in claim 2 in which said tubular extension terminates upwardly at the bottom of said filler well, said filler cap being relieved to permit operation of said valve in another portion, said filler cap being vented by having a perforation leading to the said relieved portion, said filler cap also having means to seal the top of said filler well and having threaded engagement with the walls of said filler well.

CHARLES L. KELLER.